United States Patent
Hsieh

(10) Patent No.: US 6,597,591 B2
(45) Date of Patent: Jul. 22, 2003

(54) TRANSFORMERLESS AC/DC CONVERTER

(75) Inventor: Hsin Mao Hsieh, Taipei (TW)

(73) Assignee: Adda Corporation, Ping-Tung City (TW)

(*) Notice: Subject to any disclaimer, the term of this patent is extended or adjusted under 35 U.S.C. 154(b) by 0 days.

(21) Appl. No.: 09/998,161

(22) Filed: Dec. 3, 2001

(65) Prior Publication Data

US 2003/0103365 A1 Jun. 5, 2003

(51) Int. Cl.[7] ............................................. H02M 7/04
(52) U.S. Cl. ................................... 363/89; 363/125
(58) Field of Search ........................ 363/84, 89, 125, 363/126, 127

(56) References Cited

U.S. PATENT DOCUMENTS

| | | | | |
|---|---|---|---|---|
| 4,709,322 A | * | 11/1987 | Mirow | 363/86 |
| 5,561,597 A | * | 10/1996 | Limpaecher | 363/59 |
| 5,646,514 A | * | 7/1997 | Tsunetsugu | 323/288 |
| 5,818,708 A | * | 10/1998 | Wong | 363/89 |
| 5,914,869 A | * | 6/1999 | Troiano | 363/61 |

* cited by examiner

Primary Examiner—Adolf Denske Berhane
(74) Attorney, Agent, or Firm—Leong C. Lei

(57) ABSTRACT

A voltage transformer for AC/DC comprising an IC having a rectifying unit with a function to transform AC of full waveform to continuous semi waveform, and a wave-filtering unit employing Gate transient voltage preset by Field Effect Transistor to proceed with filtering sample by ON and OFF method such that the preset voltage passes through the output terminal and achieves the effect of transformed voltage, and a voltage stabilizing unit which processes the output voltage for suitable utilization, wherein the sampling method of the AC with respect to Field Effect Transistor includes: (i) Fixed voltage sampling and (ii) Fixed time sampling method.

1 Claim, 5 Drawing Sheets

US 6,597,591 B2

TRANSFORMERLESS AC/DC CONVERTER

BACKGROUND OF THE INVENTION (a) Technical Field of the Invention

The present invention relates to a voltage transformer, which converts AC or DC as input power source to a preset voltage.

(b) Description of the Prior Art

Most electrical appliances are generally provided with a voltage transformer so as to change voltage at 110 V or 220 V for DC power source.

As shown in FIG. 1, the conventional transformer includes a transformer coil a, a rectifying element b and a voltage stabilizing element c. The transformer coil converts the AC 110 V or AC 220 V of the input terminal to smaller voltage AC by means of magnetic induction of the transformer coil, and via the bridge-type rectifying element b, the AC is transformed to DC. A capacitor is connected in series so as to stabilize the output voltage.

Although this conventional transformer has the advantage of having a simple structure, the following drawbacks are commonly found:

Due to the components, such as the transformer coil, etc, the size of the transformer cannot be made into a smaller size device.

Conventional transformer does not applicable to AC and DC.

Vibration, distortion, and hear are produced in the conventional transformer.

Heat energy is evolved and the housing of the transformer may be damaged after a period of use.

If the input voltage is not stable, the output voltage from the transformer may be too great that electrical appliances may be damaged.

SUMMARY OF THE INVENTION

Accordingly, it is an object of the present invention to provide a voltage transformer AC and DC, wherein electronic parts are provided on a circuit board so as to lower the voltage of the power source and the vibration and noise of the conventional transformer are not found, and the AC and DC voltage are used as input voltage, and thus, the size and weigh of the transformer are reduced.

Yet another object of the present invention is to provide a voltage transformer AC and DC, wherein the essential electrical components produce low heat energy and their workability are stable, ensuring the stability of the output voltage, with no distortion and surge.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
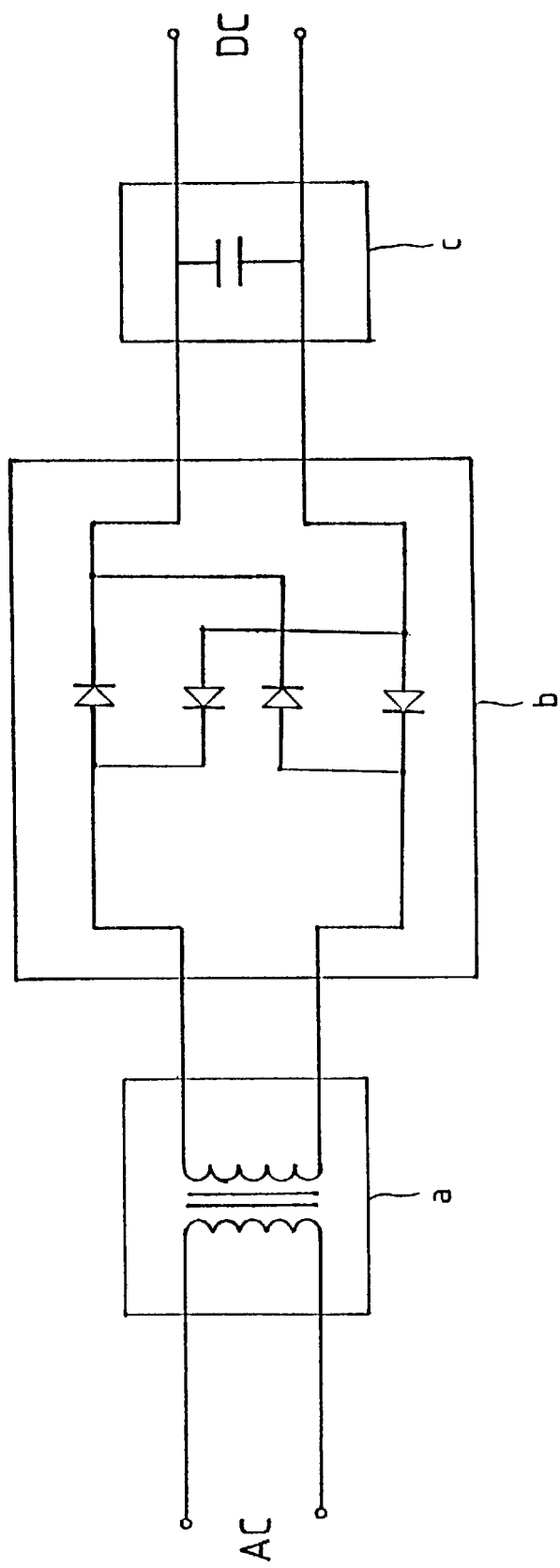
FIG. 1 is an operation circuit of a conventional transformer.
Figure 2:
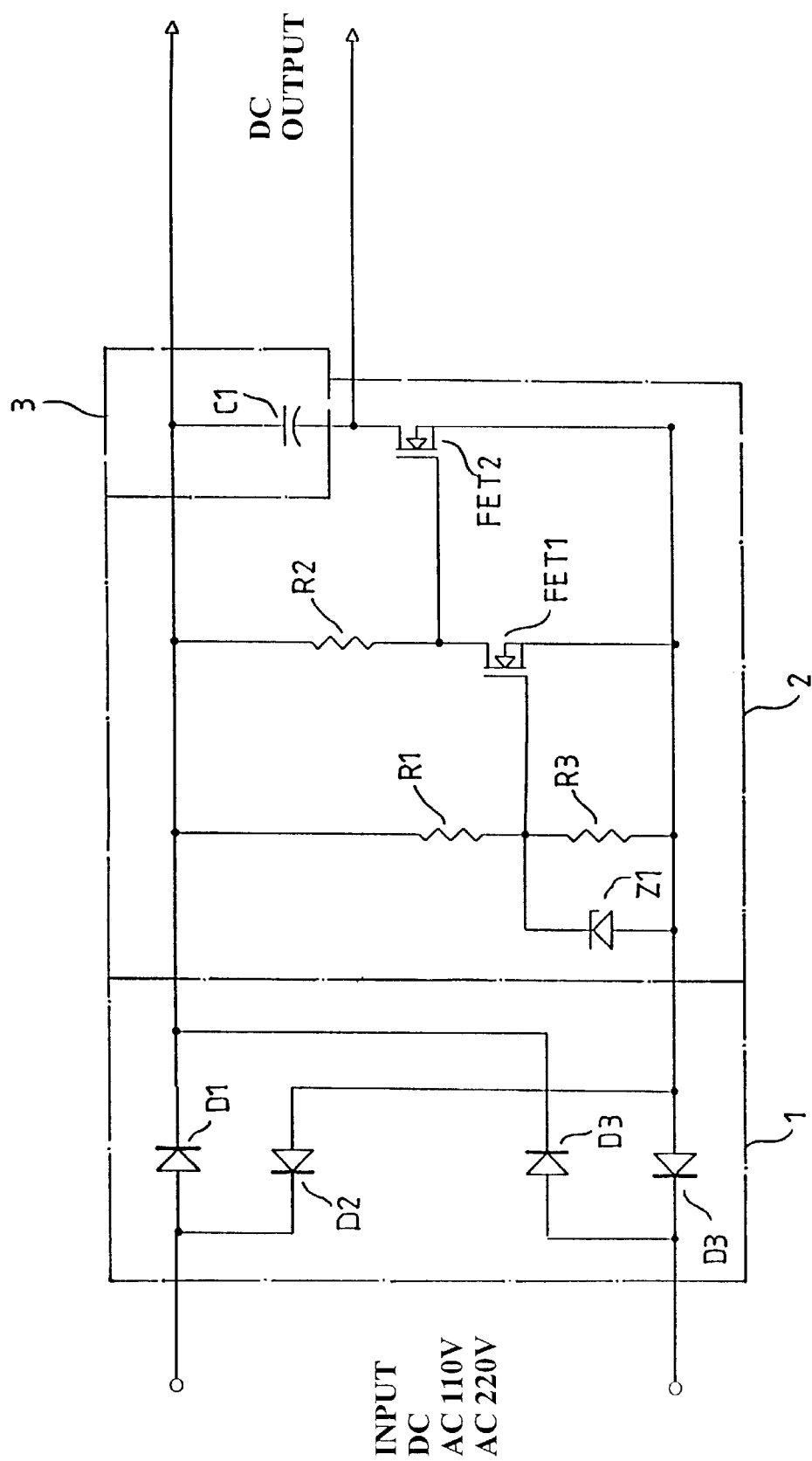
FIG. 2 is a circuit diagram of the present invention.
Figure 3:
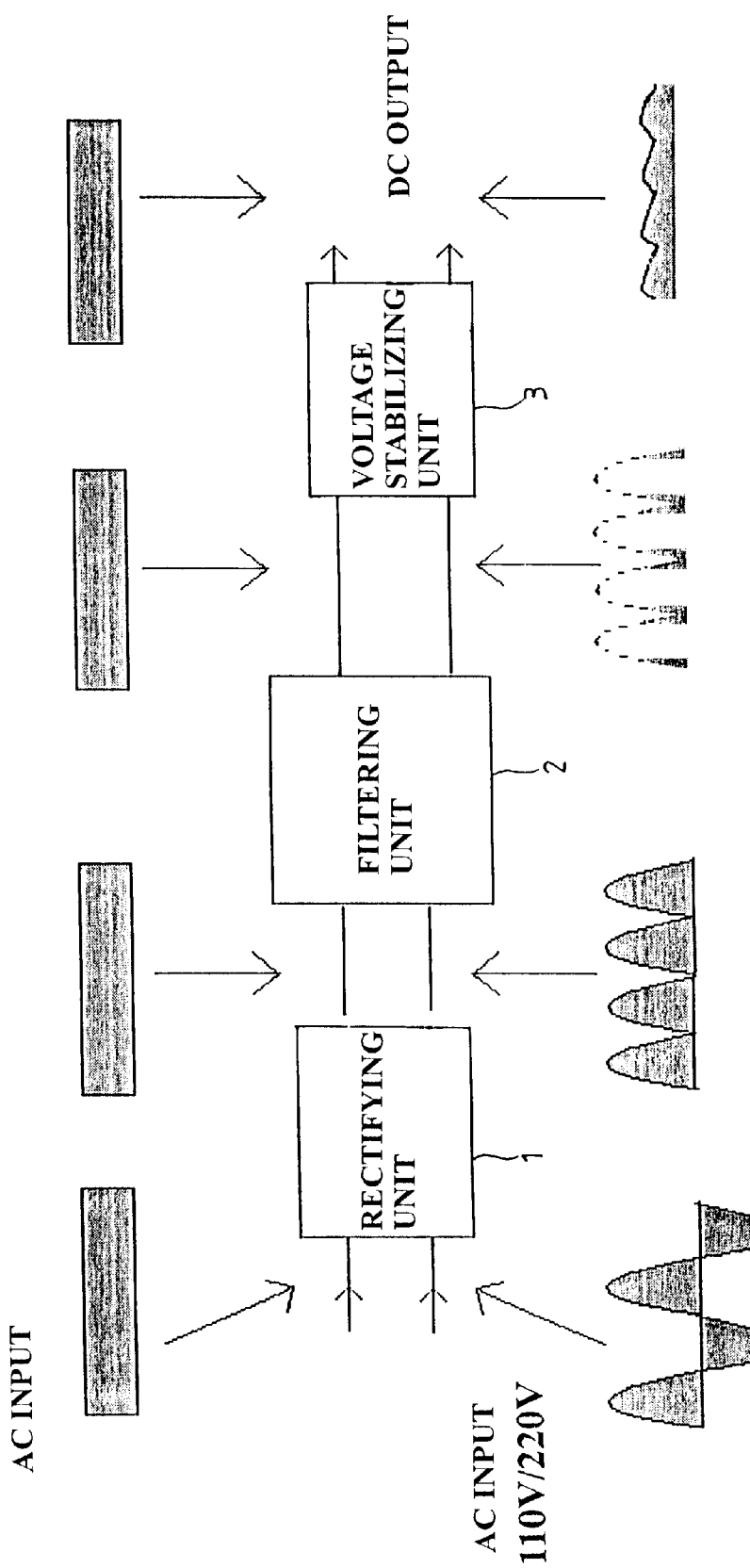
FIG. 3 is a schematic view showing the operation of the transformer in accordance with the present invention.

The present invention relates to a transformerless AC/DC converter comprising an electrical circuit including a rectifying unit, a filtering unit, and voltage-stabilizing unit, and the filter-sampling method being used to achieve the function of voltage transformation by inputting of DC or AC. First, referring to FIG. 2, the rectifying unit 1 is a bridge-type rectifying module including two diodes, a filtering unit 2 includes one Zener diode, two Field Effect Transistor (FET) and a plurality of resistors, and a voltage stabilizing unit 3 including a capacitor. FIG. 3 is a schematic view showing the operation of the transformer in accordance with the present invention. The working of the transformer with respect to AC or DC is as follows:

(A) DC Input Voltage:

When the voltage of the input terminal of the electronic circuit is DC voltage, the DC voltage arrives at the gate transient of FET 2 of the filtering unit 2 (assuming $0 \leq Vin \leq 20$), and the FET 2 is electrically in communication. At this instance, FET 1 maintains at OFF and therefore the DC voltage can be directly delivery to the output terminal.

(B) AC Input Voltage:

When the electronic circuit voltage input terminal is AC voltage, the rectifying unit 1 changes the AC from full waveform to continuous semi waveform When the AC voltage is at the gate transient voltage of FET 2 of the filtering unit 2 (assuming $0 \leq Vin \leq 20$), FET 2 is electrically in communication, and the AC voltage output filtering unit 2 is delivered to the capacitor (C1). If the AC voltage arrives at the gate transient voltage of the FET 1 (assuming Vin>20), FET 1 is electrically in communication, and the gate of the FET 2 (due to the impact of FET 1) is lower than the gate transient voltage, the FET 2 changes to OFF, and the voltage cannot be continuously delivered, and under the voltage change, voltage within the preset range is continuously accessed and is output, and let capacitor C1 to proceed with voltage stabilizing. Thus, stable DC voltage can be output at the output terminal (Vout=20).

Figure 4:
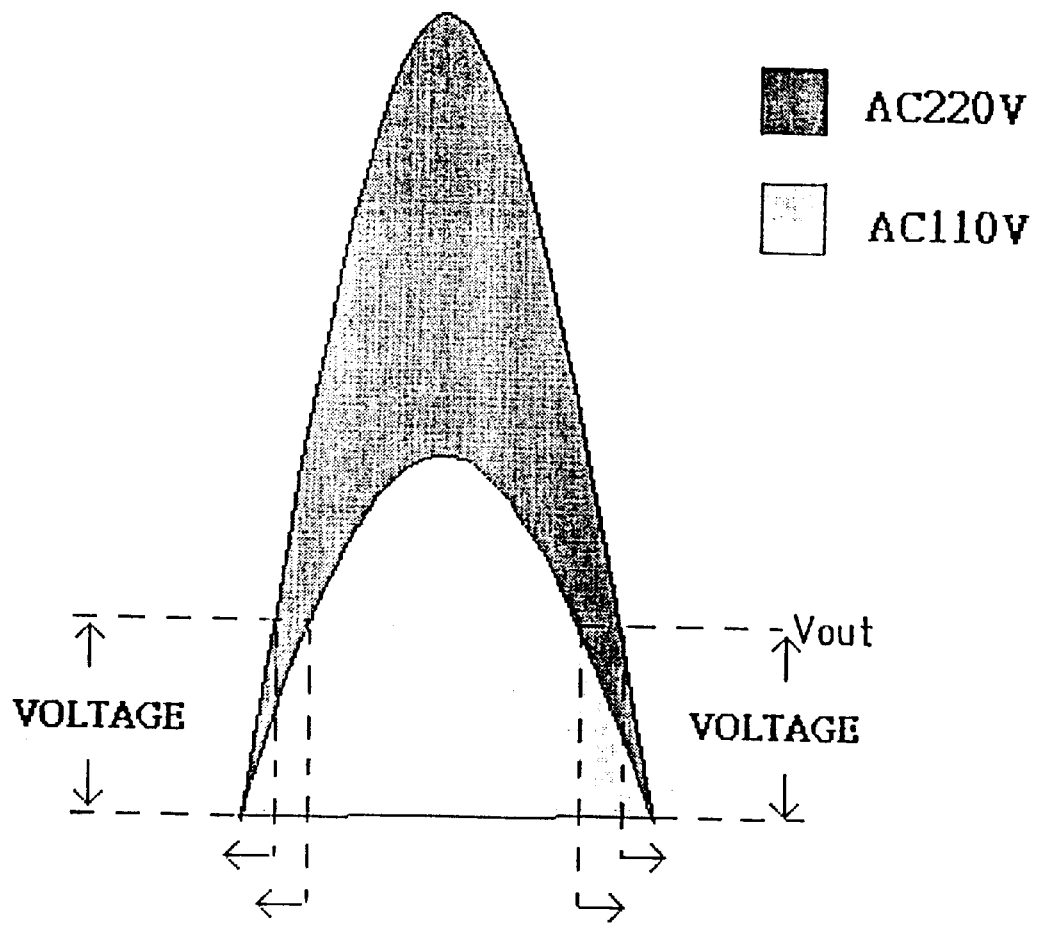
FIG. 4 is a schematic view showing the employing of the fixed voltage sampling as the filtering wave in accordance with the present invention.

In accordance with the present invention, the above filtering method employs fixed voltage sampling to achieve voltage transform. As shown in FIG. 4, by employing the gate transient voltage preset by FET, the waveform for 110 V or 220 V can be proceeded to fixed voltage sampling such that the voltage with the preset range passes through the FET 2 output and the objective of voltage transformation is achieved.

Figure 5:
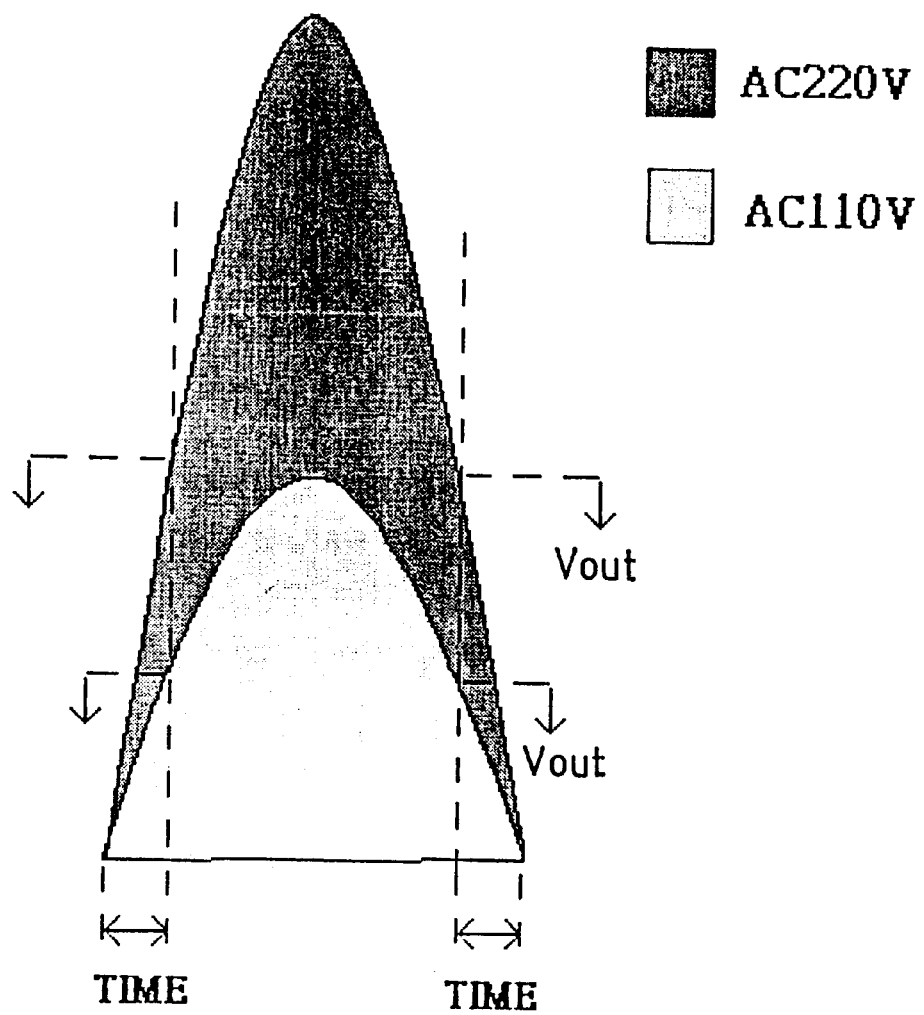
FIG. 5 is a schematic view showing the employing of the fixed time sampling as the filtering wave in accordance with the present invention.

FIG. 5 is another filtering method by way of fixed time sampling. Zener diodes, resistor and capacitor are employed as timing element. An appropriate timing after the starting of the waveform and before the employing of the waveform can be fixed so that FET 2 circuit is electrically in communication, and similarly the voltage with the preset range can be filtered so as to achieve the objective of voltage transformation.

In accordance with the present invention, the advantages of the present invention are as follows:

No transformer coil is preset and therefore the entire size and weight of the transformer are greatly reduced.

No vibration, noise and heat energy are produced.

The transformer can be employed for input voltage for DC, AC 110 V, and 220 V.

The FETs are either at ON or OFF state, and therefore heat energy evolved is lesser and the energy exhausted is low.

Distortion and surge exceeded the preset voltage of FET will not reach the output terminal. Thus, the stability of voltage is assured.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A transformerless AC/DC converter comprising an IC having a rectifying unit with a function to transform AC of full waveform to continuous semi waveform, and a wave-filtering unit employing gate transient voltage preset by a first FET to proceed with filtering sample by ON and OFF method such that the preset voltage passes through the output terminal and achieves the effect of transformed voltage, and a voltage stabilizing unit which processes the output voltage for suitable utilization, wherein the sampling method of the AC with respect to the first FET includes: (i) Fixed voltage sampling: presetting gate transient voltage of FET and let the voltage within the range to pass through a second FET output, and if the output is exceed the gate transient voltage of the first FET or lower than the gate transient voltage of the second FET, the second FET is shut off and the output is stopped to achieve the objective of voltage transformation; (ii) Fixed time sampling: Employing Zener diode, resistance and capacitors to provide the function of timing can fix the appropriate time scope of after the starting and before the ending of the waveform to cause the second FET circuit to electrically communication to unload the voltage within the preset scope so as to achieve the objective of voltage transformation.

* * * * *